United States Patent
Simeoni et al.

(10) Patent No.: US 10,242,596 B2
(45) Date of Patent: Mar. 26, 2019

(54) SIMULATOR FOR LEARNING TRACHEAL INTUBATION

(75) Inventors: Umberto Simeoni, Marseilles (FR); Philippe Foucqueteau, Marseilles (FR)

(73) Assignees: ASSISTANCE PUBLIQUE DES HOPITAUX DE MARSEILLE, Marseilles (FR); UNIVERSITE D'AIX-MARSEILLE, Marseilles (FR)

( * ) Notice: Subject to any disclaimer, the term of this patent is extended or adjusted under 35 U.S.C. 154(b) by 859 days.

(21) Appl. No.: 13/881,167

(22) PCT Filed: Nov. 2, 2011

(86) PCT No.: PCT/EP2011/005517
§ 371 (c)(1),
(2), (4) Date: Apr. 24, 2013

(87) PCT Pub. No.: WO2012/059218
PCT Pub. Date: May 10, 2012

(65) Prior Publication Data
US 2013/0216992 A1  Aug. 22, 2013

(30) Foreign Application Priority Data
Nov. 2, 2010  (FR) .................................... 10 04291

(51) Int. Cl.
*G09B 23/28* (2006.01)
*G09B 23/30* (2006.01)

(52) U.S. Cl.
CPC ......... *G09B 23/288* (2013.01); *G09B 23/285* (2013.01); *G09B 23/30* (2013.01)

(58) Field of Classification Search
CPC ... A61M 16/04; G09B 23/285; G09B 23/288; G09B 23/30

(Continued)

(56) References Cited

U.S. PATENT DOCUMENTS 4,484,896 A    11/1984  Kohnke
5,823,787 A *  10/1998  Gonzalez ............... G09B 23/28
                                                       434/265

(Continued)

FOREIGN PATENT DOCUMENTS

EP    0 094 029      11/1983
WO    2004/098387    11/2004
WO    2006/110291    10/2006

OTHER PUBLICATIONS

International Search Report dated Dec. 29, 2011, corresponding to PCT/EP2011/005517.

*Primary Examiner* — Eddy Saint-Vil
(74) *Attorney, Agent, or Firm* — Young & Thompson

(57) ABSTRACT

A simulator intended for learning tracheal intubation includes: an anatomic dummy element (1) reproducing at least one buccal cavity (2) provided with a tongue (4), with an epiglottis (7) and with the corresponding glossoepiglottic vallecula (8); a simulation system (15) capable of determining at least one physiological parameter of a patient subject to tracheal intubation; at least one force sensor (13) positioned on the dummy element at the glossoepiglottic vallecula so as to measure the force applied at this level by the blade (11) of a laryngoscope (12) handled by the operator; and transmission element (14) for providing the value of the measurement conducted with the force sensor at the input of the simulation system; wherein the simulation system is laid out for taking into account the value of the measurement conducted with the force sensor in order to determine the physiological parameter.

4 Claims, 2 Drawing Sheets

Figure 1:
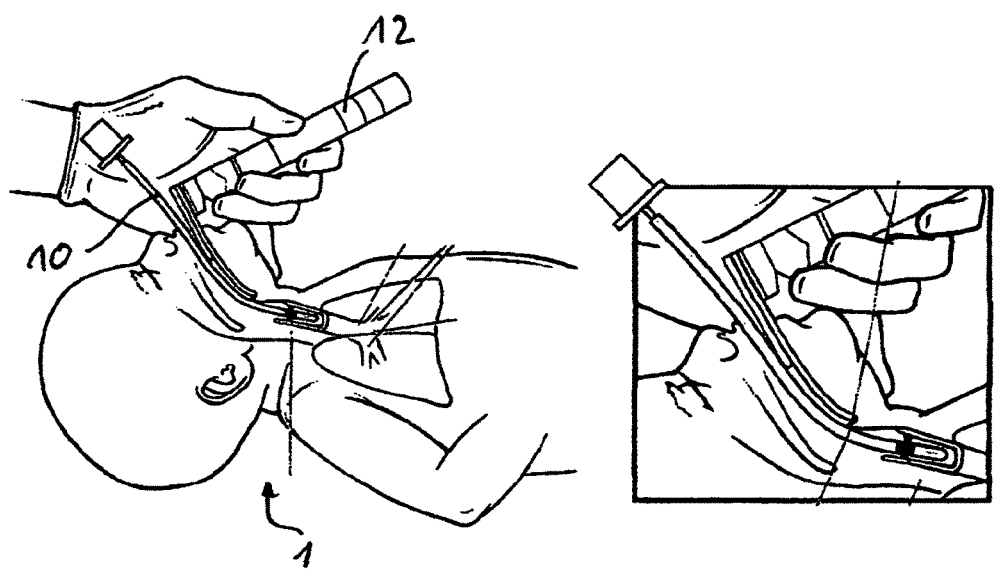

(58) Field of Classification Search
USPC .......................................................... 434/265
See application file for complete search history.

(56) References Cited

U.S. PATENT DOCUMENTS

| | | | | |
|---|---|---|---|---|
| 8,393,905 B2* | 3/2013 | Kozmenko | .............. | G09B 7/00 |
| | | | | 434/262 |
| 2004/0243234 A1* | 12/2004 | De Vincentiis | ........... | A61F 2/20 |
| | | | | 623/9 |
| 2008/0138779 A1* | 6/2008 | Eggert | ................. | G09B 23/281 |
| | | | | 434/266 |
| 2009/0162820 A1 | 6/2009 | Tada et al. | | |
| 2009/0208915 A1* | 8/2009 | Pugh | ....................... | G09B 23/30 |
| | | | | 434/267 |
| 2011/0010155 A1* | 1/2011 | Takanishi | ................ | G09B 23/32 |
| | | | | 703/11 |
| 2012/0215074 A1* | 8/2012 | Krimsky | ................ | A61B 1/012 |
| | | | | 600/301 |

* cited by examiner

US 10,242,596 B2

SIMULATOR FOR LEARNING TRACHEAL INTUBATION

The present invention relates to a simulator intended for learning tracheal intubation and more particularly to such a simulator comprising an anatomic dummy elements reproducing at least a buccal cavity provided with a tongue, an epiglottis and a corresponding glossoepiglottic vallecula, a simulation system capable of determining the value of at least one physiological parameter of a patient subject to tracheal intubation depending on data provided at the input of said system and of communicating this value to a user.

It is known that tracheal intubation, i.e. the introduction of a tube into the trachea of a patient notably for purposes of medical resuscitation, implies resorting to a laryngoscope, allowing the glottis to be exhibited to view, the glottis being the orifice of the larynx into which the tracheal tube has to be introduced. This exposure to view is made possible by aligning without any visual obstacle the eye of the operator and the glottis, allowed by introducing the blade of the laryngoscope and by its proper positioning in the pharynx.

For this purpose, the blade of the laryngoscope is introduced into the buccal cavity of the patient and its end is applied at the base of the tongue in the glossoepiglottic vallecula. This blade is used as a retractor of the muscular structures interfering with access to the larynx, in particular the tongue of the patient.

Tracheal intubation is an aggressive medical act, poorly tolerated by the patient, and has to be carried out rapidly and delicately by the operator. The airways are partly blocked during the maneuver, and the patient feels temporary respiratory discomfort. Further, pain may be felt, from the reflex movements of the muscles of the pharynx and of the larynx and nauseous reflexes may then be caused in return by the maneuver. The exaggerated pressure of the blade of the laryngoscope in the glossoepiglottic vallecula, in particular if the movement intended to expose the glottis with the blade of the laryngoscope is not performed in the right direction, causes a reflex slowing down the heart rate and a deficiency of systemic oxygenation in the patient.

This poor tolerance of tracheal intubation by the patients and consecutive alteration of some of his/her vital functions and constants (heart rate and blood oxygenation), while the latter become fragilized by the pathological condition making the intervention necessary, therefore require preliminary and repeated training of the operators which will have to practice this procedure.

As such training may be difficult to carry out on patients, carrying it out on an anatomic dummy has already been proposed.

However, present dummies do not let the operator notice in real time the quality and the physiological tolerance of his/her intervention, and possibly correct it while gradually checking the efficiency of the correction.

The invention aims at overcoming these drawbacks.

More particularly, the object of the invention is to provide a simulator intended for learning tracheal intubation which allows the operator to check in real time the quality and the physiological tolerance of his/her intervention.

The object of the invention is also to provide a method for applying the simulator.

For this purpose, the object of the invention is first of all a simulator intended for learning tracheal intubation comprising:

an anatomic dummy element reproducing one buccal cavity provided with a tongue, an epiglottis and the corresponding glossoepiglottic vallecula, a simulation system capable of determining at least one physiological parameter of a patient subject to tracheal intubation depending on data provided at the input of said system and of communicating this parameter in real time via a transducer, to an operator practicing tracheal intubation on said anatomic dummy element, this simulator further comprising at least one force sensor positioned on the dummy element at the glossoepiglottic vallecula so as to measure the force applied at this level by the blade of a laryngoscope handled by the operator, and transmission means for providing the value of the measurement conducted by said force sensor at the input of said simulation system, the simulation system being laid out so as to take into account said value of the measurement conducted with the force sensor in order to determine said physiological parameter.

In a particular embodiment, the simulation system is laid out for taking into account the duration during which the force is applied.

With the device, it is thus possible to reproduce one of the difficulties encountered in the reality of medical resuscitation during tracheal intubation: poor tolerance of this medical act by the patient and consecutive alteration of some of his/her vital functions and constants, for example the heart rate and blood oxygenation, while they are fragilized by the pathological condition making tracheal intubation necessary, notably when this act is not carried out in an optimal way in terms of duration and quality of a technical operation.

Advantageously, the anatomic dummy element (1) reproduces a child, preferably the anatomic dummy element (1) reproduces an infant.

Also in a particular embodiment, the simulation system is laid out for taking into account the intensity of the applied force.

Also in a particular embodiment, the representation of the time-dependent change of said at least one physiological parameter forms the simulation of the electrocardiogram of said patient.

The simulation system is for example laid out so that said electrocardiogram has a reference value of the heart rate, for example 135 (±15) cycles per minute, this reference value preferably decreasing over time by 5 cycles per minute every 30 seconds.

More particularly, said transducer may comprise at least one monitor capable of displaying said electrocardiogram.

The simulation means may also be laid out in order to simulate a decrease in the heart rate depending on the duration during which the force is applied. It should be noted that obtaining a zero heart rate marks the end of the simulation.

More particularly, the simulation means are laid out in order to simulate a gradual decrease in the heart rate by:

10 cycles per minute within 30 seconds in response to the detection of a continuous applied force over the period, said force applied continuously being greater than a parameterizable threshold;

35 cycles per minute within 10 seconds in response to the detection of a force with increasing intensity applied continuously over the period, said applied force being greater than said parameterizable threshold and having an increase in its intensity comprised between at least 5 and least 40%, preferably an increase in its intensity by at least 30%;

55 cycles per minute within 20 seconds in response to the detection of a force with increasing intensity applied continuously over the period, said applied force being greater than said parameterizable threshold and having an increase of its intensity comprised between at least 40 and at least 80%, preferably an increase in its intensity by at least 60%;

75 cycles per minute within more than 20 seconds in response to the detection of a force with increasing intensity applied continuously over the period, said applied force being greater than said parameterizable threshold and having an increase of its intensity comprised between at least 80% and at least 150%, preferably an increase in its intensity by at least 100%.

However, it is understood that the whole of these values are parameterizable.

Advantageously, said parameterizable threshold corresponds to pressure exerted at the force sensor positioned on the dummy element at the glossoepiglottic vallecula, which is greater than or equal to 10 N/cm$^2$, preferably greater than or equal to 20 N/cm$^2$ and, more preferably greater than or equal to 50 N/cm$^2$.

In an embodiment, the simulation means are laid out for simulating return to a normal heart rate, from the moment when a force is no longer applied on the force sensor, preferably from the moment when the applied force is less than the parameterizable threshold. Advantageously, this return to normal is carried out according to laws opposite to the ones defined earlier for the decrease in the heart rate depending on the intensity of the applied force and on the increase of the latter.

Also, in a particular embodiment, said at least one physiological parameter is oxygen saturation of the hemoglobin of said patient.

The simulation system is for example laid out so that said oxygen saturation of hemoglobin has a reference value of 94 (±4) %, this reference value preferably decreasing over time by 3% every 30 seconds.

More particularly, the simulation means may be laid out so as to simulate a decrease in the oxygen saturation of hemoglobin depending on the duration during which the force is applied.

The simulation means may notably be laid out for simulating a decrease in the oxygen saturation of hemoglobin depending on the intensity of the applied force. It should be noted that obtaining a zero value of the oxygen saturation of hemoglobin marks the end of the simulation.

Said transducer may also comprise acoustic means, the value of the oxygen saturation of hemoglobin being communicated to the operator in the form of an acoustic signal, the frequency of which depends on said value.

More particularly, the simulation means may be laid out for simulating a decrease in the oxygen saturation of hemoglobin by:

6% within 30 seconds in response to the detection of a continuously applied force over the period, said continuously applied force being greater than a parameterizable threshold;

20 (±4) % within 10 seconds in response to the detection of a force with increasing intensity continuously applied over the period, said applied force being greater than said parameterizable threshold and having an increase in its intensity comprised between at least 5 and at least 40%, preferably an increase in its intensity by at least 30%;

29 (±4) % within 20 seconds, these data being parameterizable, in response to the detection of a force with increasing intensity continuously applied over the period, said applied force being greater than said parameterizable threshold and having an increase in its intensity comprised between at least 40 and at least 80%, preferably an increase in its intensity by at least 60%;

38 (±4) % within more than 20 seconds, parameterizable data, in response to the detection of a force with increasing intensity continuously applied over the period, said applied force being greater than said parameterizable threshold and having an increase in its intensity comprised between at least 80% and at least 150%, preferably an increase in its intensity by at least 100%.

The simulation means may also be laid out for simulating return to normal oxygen saturation of hemoglobin from the moment when a force is no longer applied on the force sensor, preferably from the moment when the applied force is less than the parameterizable threshold. Advantageously, this return to normal is carried out according to laws opposite to those defined earlier for decreasing the heart rate depending on the intensity of the applied force and on the increase of the latter.

The object of the invention is also a method for applying the simulator described above, comprising the steps of
setting a reference value for said at least physiological parameter,
recording the value of the measurement conducted by the force sensor,
cyclically incrementing said physiological parameter from said reference value depending on the measurement conducted by the force sensor,
communicating in real time to the operator the incremented parameter, via said transducer.

In a particular embodiment, the method further comprises the step consisting of cyclically incrementing said physiological parameter depending on the duration of the tracheal intubation.

Figure 2:
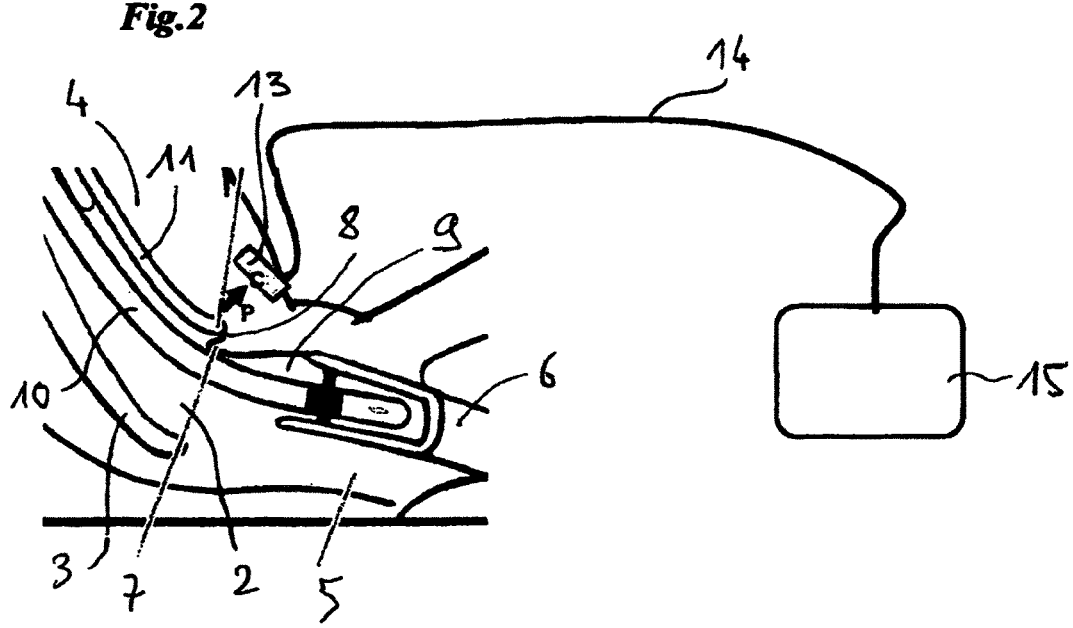
Figure 3:
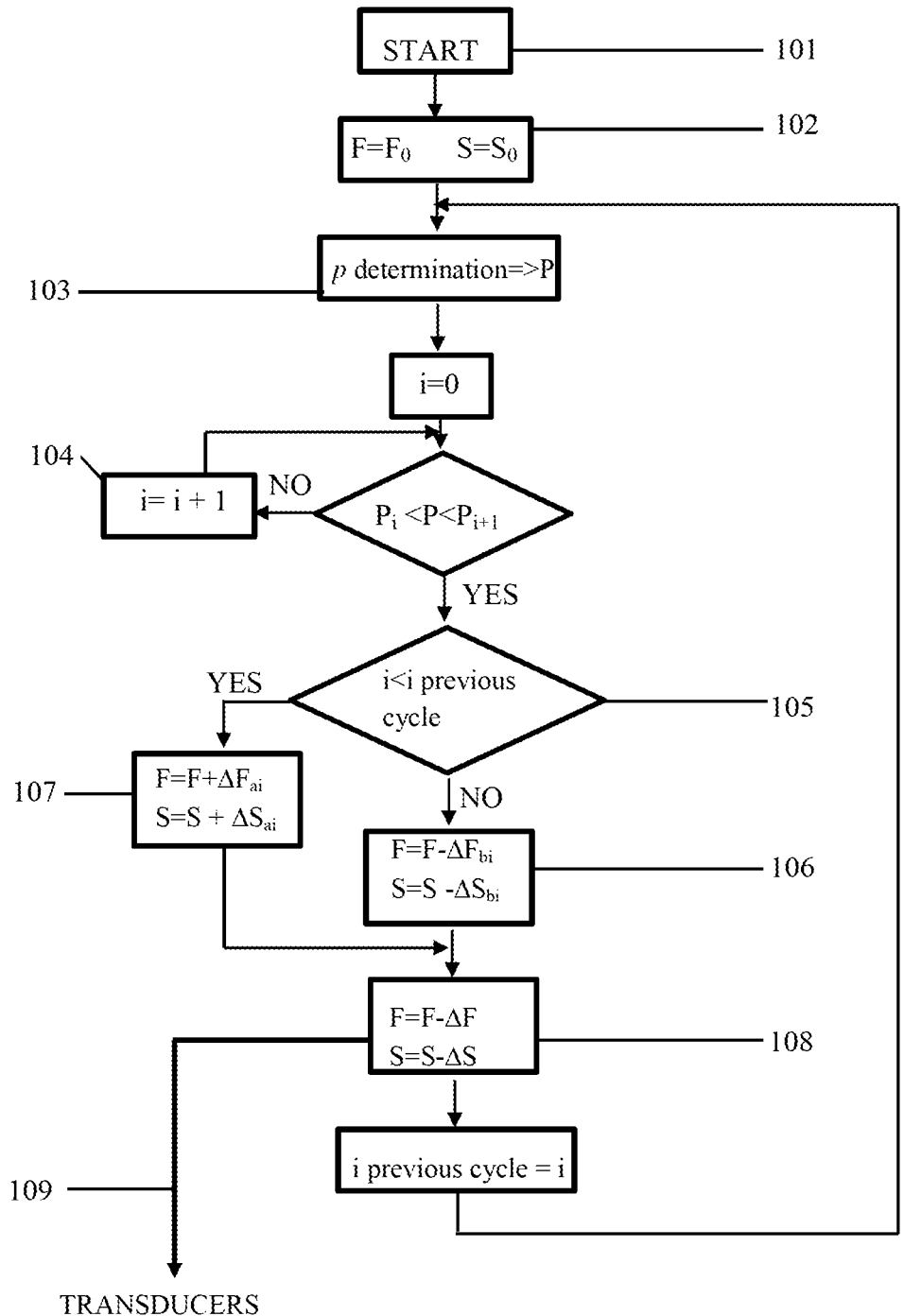

An embodiment of the invention will now be described as a non-limiting example, with reference to the appended schematic drawings wherein:

FIG. 1 is a schematic illustration of an anatomic dummy used in a simulator according to the invention, FIG. 2 is a large scale view of a detail of FIG. 1, and FIG. 3 is a flowchart of a simulation system capable of applying the method according to the invention.

An anatomic dummy 1 essentially consisting of a bust in which a buccal cavity 2 is formed essentially delimited by the palate 3 and the tongue 4 is seen in FIGS. 1 and 2. Moreover, the esophagus 5 and the trachea 6 as well as the epiglottis 7 formed at the root of the tongue 4 are also seen. The tongue 4 and the epiglottis 7 delimit together the glossoepiglottic furrow or vallecula 8. The trachea opens into the buccal cavity through an orifice 9 forming the glottis.

The anatomic dummy which has just been described has the purpose of facilitating the learning of tracheal intubation.

Tracheal intubation consists of introducing a tracheal tube 10 in the glottis 9 of the patient. For this purpose, the glottis should be exposed to the view of the operator, which requires a visual alignment of the eye of the operator and of the glottis. This is carried out by means of the blade 11 of a laryngoscope 12.

For this purpose, the end of the blade 11 is applied to the bottom of the glossoepiglottic vallecula 8 and this blade is pressed upwards by the operator (in the direction orientated downwards, opposite to the plate, when the patient is in the standing position). It is this operation which causes the physiological reactions described above.

According to the invention, a force sensor 13 is positioned on the dummy 1 at the glossoepiglottic vallecula 8, under the root of the tongue so as to be sensitive to the force applied by the blade 11 of the laryngoscope 12 (hereafter, one will equally refer to the applied force or to the pressure exerted by the blade 11). With an electric conductor 14, it is possible to transmit the result of the measurement conducted by the sensor 13 to a microcomputer 15 comprising at least data processing means, a video monitor intended to display an electrocardiogram simulation depending on the measurements conducted with the sensor 13 and a loudspeaker intended to transmit sound also depending on one of the measurements conducted by the sensor 13 and representative of a simulation of oxygen saturation of hemoglobin.

An algorithm for deriving the heart rate F and the oxygen saturation of hemoglobin 5 from the simulation has been described above. An alternative with reference to FIG. 3 will be given thereof, here.

First, for the measurements conducted with the sensor 13, a set of pressure ranges $[P_i, P_{i+1}]$, will be defined from a first pressure threshold $P_0$. A reference heart rate $F_0$ and a reference oxygen saturation of hemoglobin $S_0$, are also set, as well as increments related to the duration, $\Delta F$ for the heart rate and $\Delta S$ for the oxygen saturation of hemoglobin. For each pressure range $[P_i, P_{i+1}]$, a positive increment $\Delta F_{ai}$ and a negative increment $\Delta F_{bi}$ for the heart rate and a positive increment $\Delta S_{ai}$ and a negative increment $\Delta S_{bi}$ for the oxygen saturation of hemoglobin are further set.

At the beginning of the simulation (101), the values of F and S to $F_0$ and $S_0$ (102) are set. A value P from the measurement p conducted with the sensor 13 (103) is then acquired.

The loop 104 gives the possibility of determining in which pressure range $[P_i, P_{i+1}]$ the present value of P is found.

The following test 105 aimed at determining whether the pressure exerted by the laryngoscope has increased or decreased. If the pressure has remained stable or has increased, F and S are negatively incremented by $\Delta F_{bi}$ and $\Delta S_{bi}$ (106) respectively (the heart rate and the oxygen saturation of hemoglobin decrease). If, on the contrary, the pressure has decreased, F and S are positively incremented by $\Delta F_{ai}$ and $\Delta S_{ai}$ (107) respectively (the heart rate and the oxygen saturation of hemoglobin increase).

The steps 105, 106 and 107 therefore simulate the quality of the intervention.

Further, regardless of this quality, F and S are incremented negatively by $\Delta F$ and $\Delta S$ at each cycle (108) in order to take into account the effects of the duration of the intervention. Suitable arrangements are taken in order to ensure constancy of the duration of the cycles.

Further, provision may be made for random variations of F and of S.

The updated values of F and S are communicated to the transducers (monitor and loudspeaker) in 109.

Finally, the pressure range $[P_i, P_{i+1}]$ in which P is found, is stored in memory in 110 in order to determine in the next cycle how the exerted pressure has changed, and a new cycle is initiated.

The software of the microcomputer 15 simulates on the monitor an electrocardiogram at frequency F determined as earlier. Moreover, it controls the loudspeaker so that the latter transmits a succession of beeps at the rhythm of the heartbeat and the high or low tone of which depends on S.

The invention claimed is:

1. A simulator intended for learning tracheal intubation comprising:
    an anatomic dummy element (1) reproducing an infant with at least one buccal cavity (2) provided with a tongue (4), an epiglottis (7) and the corresponding glossoepiglottic vallecula (8);
    a force sensor (13) positioned on the anatomic dummy element at the glossoepiglottic vallecula so as to measure a force applied at this position by a blade (11) of a laryngoscope (12) handled by an operator practicing a tracheal intubation;
    transmission means (14) for providing a value of the measurement conducted by said force sensor to an input of a simulation system; and
    the simulation system (15) comprising a data processor, the simulation system reproduces physiological parameters of heart rate and oxygen saturation of hemoglobin of the infant, which is subjected to the tracheal intubation depending on the pressure exerted at the force sensor provided at the input of said simulation system, and communicates the determined physiological parameters of heart rate and oxygen saturation of hemoglobin in real time via a transducer (15) to the operator practicing tracheal intubation on said anatomic dummy element, said transducer comprising a monitor that displays an electrocardiogram of the infant and an acoustic device that provides an acoustic signal whose frequency depends on the oxygen saturation of hemoglobin of the infant;
    wherein the monitor displays (i) a heart rate reference value of 135 (+/−15) cycles per minute, (ii) a heart rate decrease by
        10 cycles per minute within 30 seconds in response to the detection of a continuously applied force over the period, said continuously applied force over the period corresponding to the pressure exerted on the force sensor that is greater than a threshold equal to 10 N/cm$^2$,
        35 cycles per minute within 10 seconds in response to detection of a force within increasing intensity continuously applied over the period, said applied force over the period being greater than said threshold and having an increase in its intensity comprised between at least 5% and at least 40%,
        55 cycles per minute within 20 seconds in response to the detection of a force with increasing intensity continuously applied over the period, said applied force over the period being greater than said threshold and having an increase in its intensity comprised between at least 40% and at least 80%,
        75 cycles per minute within more than 20 seconds in response to the detection of a force with increasing intensity continuously applied over the period, said continuously applied force over the period being greater than said threshold and having an increase in its intensity comprised between at least 80% and at least 150%, (iii) a return to the reference value of heart rate from the moment when a force is no longer applied on the force sensor, said return to the reference of heart rate value being carried out according to steps opposite to the steps defined previously for the decrease in the heart rate depending on the intensity of the applied force and on the increase of the latter, and (iv) the obtaining of a zero heart rate marking an end of the simulation;

wherein the acoustic device provides an acoustic signal whose frequency corresponds to (i) a reference value of the oxygen saturation of hemoglobin of 94% (+/−4), (ii) a decrease of oxygen saturation of hemoglobin by 6% within 30 seconds in response to the detection of a force continuously applied over the period, said continuously applied force over the period corresponding to the pressure exerted on the force sensor that is greater than a threshold equal to 10 N/cm$^2$, 20 (±4)% within 10 seconds in response to the detection of a force with increasing intensity, continuously applied over the period, said applied force over the period being greater than said threshold and having an increase in its intensity comprised between at least 5% and at least 40%, 29 (±4)% within 20 seconds in response to the detection of a force with increasing intensity continuously applied over the period, said applied force over the period being greater than said threshold and having an increase its intensity comprised between at least 40% and at least 80%, 38 (±4)% within more than 20 seconds in response to the detection of a force with increasing intensity continuously applied over the period, said continuously applied force over the period being greater than said threshold and having an increase in its intensity comprised between at least 80% and at least 150%, (iii) a return to the reference value of oxygen saturation of hemoglobin from the moment when a force is no longer applied on the force sensor, said return to the reference value of oxygen saturation being carried out according to steps opposite to the steps defined previously for the decrease in the oxygen saturation of hemoglobin depending on the intensity of the applied force and on the increase of the latter, and (iv) the obtaining of zero oxygen saturation of hemoglobin marking the end of the simulation.

2. The simulator according to claim 1, wherein said threshold corresponds to the pressure exerted on the force sensor (13) which is greater than or equal to 20 N/cm$^2$.

3. The simulator according to claim 1, wherein said threshold corresponds to the pressure exerted on the force sensor (13) which is greater than or equal to 50 N/cm$^2$.

4. A method for applying a simulator for learning tracheal intubation that includes, an anatomic dummy element (1) reproducing an infant with at least one buccal cavity (2) provided with a tongue (4), an epiglottis (7) and the corresponding glossoepiglottic vallecula (8), a force sensor (13) positioned on the anatomic dummy element at the glossoepiglottic vallecula so as to measure a force applied at this position by a blade (11) of a laryngoscope (12) handled by an operator practicing a tracheal intubation;

transmission means (14) for providing a value of the measurement conducted by said force sensor to an input of a simulation system; and the simulation system (15) comprising a data processor, the simulation system reproduces physiological parameters of heart rate and oxygen saturation of hemoglobin of the infant, which is subjected to the tracheal intubation depending on the pressure exerted at the force sensor provided at the input of said simulation system, and communicates the determined physiological parameters of heart rate and oxygen saturation of hemoglobin in real time via a transducer (15) to the operator practicing tracheal intubation on said anatomic dummy element, said transducer comprising a monitor that displays an electrocardiogram of the infant and an acoustic device that provides an acoustic signal whose frequency depends on the oxygen saturation of hemoglobin of the infant;

the method comprising the steps of:

setting a reference value (102) of 135 (+/−15) cycles per minute for the heart rate and a reference value of 94% (+/−4) for the oxygen saturation of hemoglobin;

recording the value of the measurement conducted with the force sensor (103) resulting from the force applied by the blade of the laryngoscope handled by the operator;

cyclically incrementing (105-107) said physiological parameters from respective said reference values depending on the measurements conducted with the force sensor, resulting from the force applied by the blade of the laryngoscope handled by the operator for reproducing a physiological tolerance to this medical act by the infant and consecutive alteration of some of the infant's vital functions and constants; and the method further comprising communicating (109) in real time to the operator, the incremented parameter, via said transducer, and the operator determining in real time the physiological tolerance by the infant to the operator's intervention, wherein the monitor displays the reference value for the heart rate and a heart rate decrease by 10 cycles per minute within 30 seconds in response to the detection of a continuously applied force over the period, said continuously applied force over the period corresponding to the pressure exerted on the force sensor that is greater than a threshold equal to 10 N/cm$^2$, 35 cycles per minute within 10 seconds in response to detection of a force within increasing intensity continuously applied over the period, said applied force over the period being greater than said threshold and having an increase in its intensity comprised between at least 5% and at least 40%, 55 cycles per minute within 20 seconds in response to the detection of a force with increasing intensity continuously applied over the period, said applied force over the period being greater than said threshold and having an increase in its intensity comprised between at least 40% and at least 80%, 75 cycles per minute within more than 20 seconds in response to the detection of a force with increasing intensity continuously applied over the period, said continuously applied force over the period being greater than said threshold and having an increase in its intensity comprised between at least 80% and at least 150%, and wherein the monitor displays a return to the reference value of heart rate from the moment when a force is no longer applied on the force sensor, said return to the reference value of heart rate being carried out according to steps opposite to the steps defined previously for the decrease in the heart rate depending on the intensity of the applied force and on the increase of the latter, and the obtaining of a zero heart rate marking an end of the simulation;

wherein the acoustic device provides a decrease of the acoustic signal whose frequency corresponds to oxygen saturation of hemoglobin from the reference value of oxygen saturation of hemoglobin of 94% (+/−4) by 6% within 30 seconds in response to the detection of a force continuously applied over the period, said continuously applied force over the period corresponding to the pressure exerted on the force sensor that is greater than a threshold equal to 10 N/cm$^2$, 20 (±4)% within 10 seconds in response to the detection of a force with increasing intensity, continuously applied over the period, said applied force over the period being greater than said threshold and having an increase in its intensity comprised between at least 5% and at least 40%, 29 (±4)% within 20 seconds in response to the detection of a force with increasing intensity continuously applied over the period, said applied force over the period being greater than said threshold and having an increase its intensity comprised between at least 40% and at least 80%, 38 (±4)% within more than 20 seconds in response to the detection of a force with increasing intensity continuously applied over the period, said continuously applied force over the period being greater than said threshold and having an increase in its intensity comprised between at least 80% and at least 150%, and the acoustic device provides an acoustic signal whose frequency corresponds to a return to the reference value of oxygen saturation of hemoglobin from the moment when a force is no longer applied on the force sensor, said return to the reference value of oxygen saturation of hemoglobin being carried out according to steps opposite to the steps defined previously for the decrease in the oxygen saturation of hemoglobin depending on the intensity of the applied force and on the increase of the latter, and the obtaining of a zero oxygen saturation of hemoglobin marking the end of the simulation.

* * * * *